Jan. 13, 1942.   G. M. M. GRANT   2,269,763
PISTON RING
Filed Aug. 5, 1940

INVENTOR.
Gerald M. M. Grant
BY

Patented Jan. 13, 1942

2,269,763

UNITED STATES PATENT OFFICE 2,269,763

PISTON RING

Gerald M. M. Grant, Los Angeles, Calif.

Application August 5, 1940, Serial No. 351,491

3 Claims. (Cl. 309—44)

My invention relates to piston rings, and more particularly to a two-part piston ring, one part being a self-expanding ring and resting upon the other part, while said other part has provision for an expansion spring resting thereupon, under said first part, said parts being movable independently of each other outwardly against the wall of the cylinder.

Among the salient objects of my invention are: To provide a piston or compression ring of the character referred to in which a steel sealing ring of full depth is positioned in the top of the piston ring groove, with a cast iron piston ring thereunder, also of full depth, said cast iron piston ring having a spring-receiving recess or angle in which is placed an expansion spring therefor, which spring is under the steel sealing ring.

To provide a self-expanding sealing ring of full depth, and a cast iron compression ring also of full depth thereunder and resting upon the lower side or land of the groove to take the pressure of each compression stroke, whereby to give longer life to the piston land.

To provide a compression ring of the character referred to which will efficiently function on a worn or tapered cylinder wall, the steel, self-expanding sealing ring sealing off the compression from reaching the cast iron ring thereunder and compressing it, as when the pressure gets between the cylinder wall and said cast iron ring.

Figure 1:
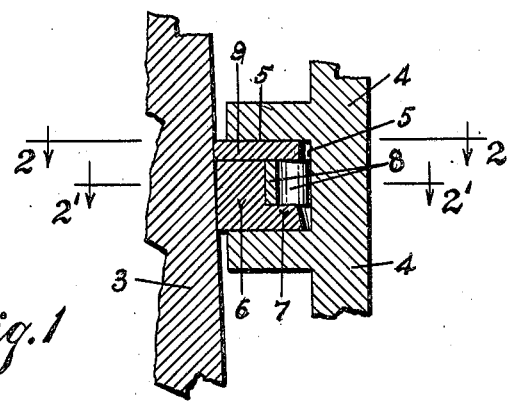
Figure 2:
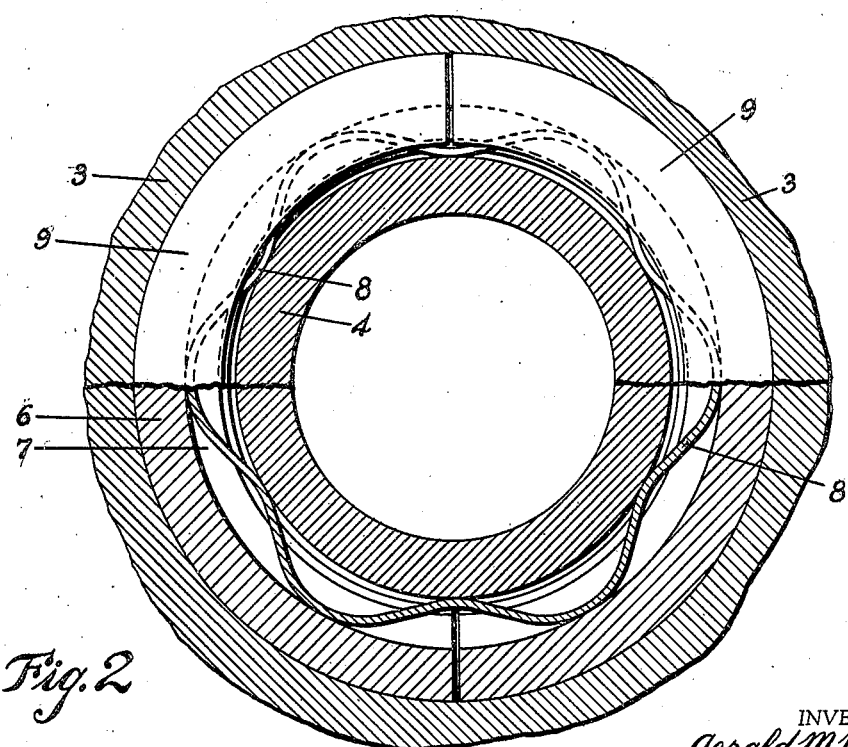

In order to more fully explain my invention, I have shown one embodiment thereof on the accompanying drawing, in which:

Figure 1 is a vertical, fragmentary sectional view through cylinder, piston and compression ring embodying my invention; and Figure 2 is a composite, horizontal sectional view, taken on the lines 2—2 and 2'—2'.

Referring in detail to the drawings, 3 designates the cylinder wall; 4 the piston wall, with one ring groove 5 shown and in which is shown my improved compression ring, which I will now describe.

A cast iron ring 6 is shown in said groove with its lower side full width or full depth with the lower side or land of said groove, and with its upper, inner portion formed into a spring-receiving recess or angle to receive the expansion spring 8, as clearly indicated.

Mounted upon said cast iron ring 6 is a relatively thin steel, self-expanding ring 9, also of full depth, and overlying the cast iron ring 6 and the expansion spring 8, in the manner indicated.

As this steel self-expansion ring bears outwardly against the wall of the cylinder, it will function to seal off compression from above and also seal oil working upwardly above the piston.

Where the cast iron rings are above, compression works between the ring and the cylinder and causes a certain compression of the cast iron ring and permits the compression to work through and also permits oil to work up, especially after the cylinder wall becomes worn and somewhat tapered. With this arrangement, this objection has been overcome. The larger cast iron ring also serves to better distribute the heat from the piston and to cool said piston.

The two rings are independent of each other in their expansion functions, and as a cast iron ring is a better bearing ring to rest upon the lower side or land of the groove, in order to avoid wear on said surface, my improved arrangement positions a full depth cast iron ring on the groove wall or land, thus sealing the land more completely.

My expansion spring operates only on the cast iron ring and underlies the steel self-expanding ring 9, thus providing two effective expansion rings, each independent of the other, and each of full depth.

I do not limit my invention to the exact details of construction and arrangement here shown for explanatory purposes, except as I may be limited by the hereto appended claims.

I claim:

1. The combination with a piston having a piston ring groove, and a cylinder therefor, of a relatively thin steel self-expanding full depth ring in the top part of said groove, a full depth cast iron ring thereunder filling said groove, said cast iron ring having a spring-receiving angle in its inner upper corner, and an expansion spring seated in said angle above the lower part of said cast iron ring and underlying said steel self-expanding ring.

2. The combination with a piston having a piston ring groove, and a cylinder therefor, of a relatively thin steel self-expanding ring in the top of said groove, a full depth cast iron ring thereunder filling said groove, said cast iron ring having a spring-receiving recess in its upper inner portion, and an expansion spring seated in said recess above the lower part of said cast iron ring and underlying said steel self-expanding ring, whereby said steel self-expanding ring and said cast iron ring are independently movable one upon the other.

3. In a piston having a piston ring groove, a relatively thin steel self-expanding ring in the upper part of said groove, a cast iron ring in said groove underlying said steel ring and having in its inner, upper corner a spring receiving recess, and an expansion spring in said recess above the lower part of said cast iron ring by which it is supported and underlying said steel self-expansion ring, whereby said rings are independent of each other in their expansion function.

GERALD M. M. GRANT.